US005550527A

United States Patent [19]

Lee

[11] Patent Number: 5,550,527
[45] Date of Patent: Aug. 27, 1996

[54] RESISTOR DEVICE FOR CONTROLLING A ROTATIONAL SPEED OF A MOTOR

[75] Inventor: Woo Y. Lee, Seoul, Rep. of Korea

[73] Assignee: Dong A Electric Parts Co., Ltd., Kuri-si, Rep. of Korea

[21] Appl. No.: 270,129

[22] Filed: Jul. 1, 1994

[51] Int. Cl.⁶ ........................................ H01C 13/00
[52] U.S. Cl. ................. 338/50; 338/24; 338/92; 338/51; 338/95; 310/68 C; 310/68 D; 361/23; 361/27
[58] Field of Search ..................... 338/92, 24, 95, 338/50, 51, 234; 310/68 C, 68 D; 361/23, 24, 25, 26, 30

[56] References Cited

U.S. PATENT DOCUMENTS

| | | | |
|---|---|---|---|
| 4,034,265 | 7/1977 | DuRocher et al. | 361/25 |
| 4,247,842 | 1/1981 | Bengsch et al. | 338/302 |
| 4,408,244 | 10/1983 | Weible | 361/24 |
| 4,992,687 | 2/1991 | Nel | 310/68 D |
| 5,000,662 | 3/1991 | Yamamoto et al. | 338/308 |
| 5,291,174 | 3/1994 | Zimheld et al. | 338/50 X |
| 5,294,852 | 3/1994 | Straker | 310/68 C |

Primary Examiner—Teresa J. Walberg
Assistant Examiner—Karl Easthom
Attorney, Agent, or Firm—Morgan & Finnegan, L.L.P.

[57] ABSTRACT

A resistor device for controlling a rotational speed of a resistance unit and an open-circuit means. A receiving recess is provided to any one side surface of a heat sink vertically affixed to a top surface plate of a housing. A resistance unit, which is protected by a film and made of metal material forming a resistor circuit for gradually controlling the rotational speed of a motor, is received within the recess in the heat sink and connected to a terminal. An open-circuit means, having a soldered portion which is fused at a predetermined temperature upon an overload of the motor, is provided at a predetermined distance between the resistance unit and a terminal.

6 Claims, 4 Drawing Sheets

5,550,527

RESISTOR DEVICE FOR CONTROLLING A ROTATIONAL SPEED OF A MOTOR

BACKGROUND OF THE INVENTION

The present invention relates to a resistor device for controlling a rotational speed of a motor, and more particularly, to a resistor device for controlling a rotational speed of a motor having an improved resistor for controlling the rotational speed of the motor and having a circuit open means for preventing a burning damage of the motor.

Generally, a resistor circuit for a resistor is used to control the rotational speed of a motor. However, a resistor circuit provided to a conventional resistor is made to a structure which is silk-printed by an ink on a resin base plate. However, a problem exists that when a shock is applied to a resistor, the resin base plate formed with the resistor circuit may be readily damaged or deformed.

Additionally, a conventional resistor forms a structure directly to a resistor circuit having a short-circuit means for preventing damage to a motor by cutting off current applied to the motor side when an overload occurs due to a mechanical defect in the motor. Accordingly, a problem exists when thermal radiation of the resistor circuit is not sufficiently carried out at a portion connected to the open-circuit means. Furthermore, there has also been a problem when a by-product, such as residue produced by the fusing of the open-circuit means, becomes adhered to the resistor circuit.

SUMMARY OF THE INVENTION

Therefore, to solve the above-described problems, it is an object of the present invention to provide a resistor device for controlling the rotational speed of a motor having a resistor circuit formed on a resistance unit by a metal member and positioning the open-circuit means at a distance apart from the resistor circuit, thereby providing the resistance unit with durability and carrying out a smooth thermal radiation of the device.

To accomplish the above object of the present invention, there is provided a resistor device for controlling a rotational speed of a motor, the resistor device having a fixed plate widely made at a portion thereof and fixed uprightly with terminals therein, a resistor circuit means positioned on the fixed plate of the housing and connected to a motor by terminals thereby gradually controlling the speed of the motor, and a heat sink fixed to the fixing plate of the housing for radiating heat generated by the resistor circuit away from the device, the device comprising:

a receiving recessed portion defined on a surface of the heat sink; a resistance unit forming a resistor circuit by contacting with connecting terminals by adhering within the receiving recessed portion of the heat sink and by providing a metal member formed as a band shape to be closely contacted between a first film and a second film made in a foil shape; and a an open-circuit means positioned a predetermined distance from the resistance unit and connecting to one of the terminals, the an open-circuit means having a soldered portion that will become fuse at a predetermined temperature.

DETAILED DESCRIPTION OF THE PREFERRED EMBODIMENT

Hereinafter, a preferred embodiment of a resistor for controlling a speed of a motor in accordance with the present invention will be described in more detail with reference to the accompanying drawings.

Figure 1:
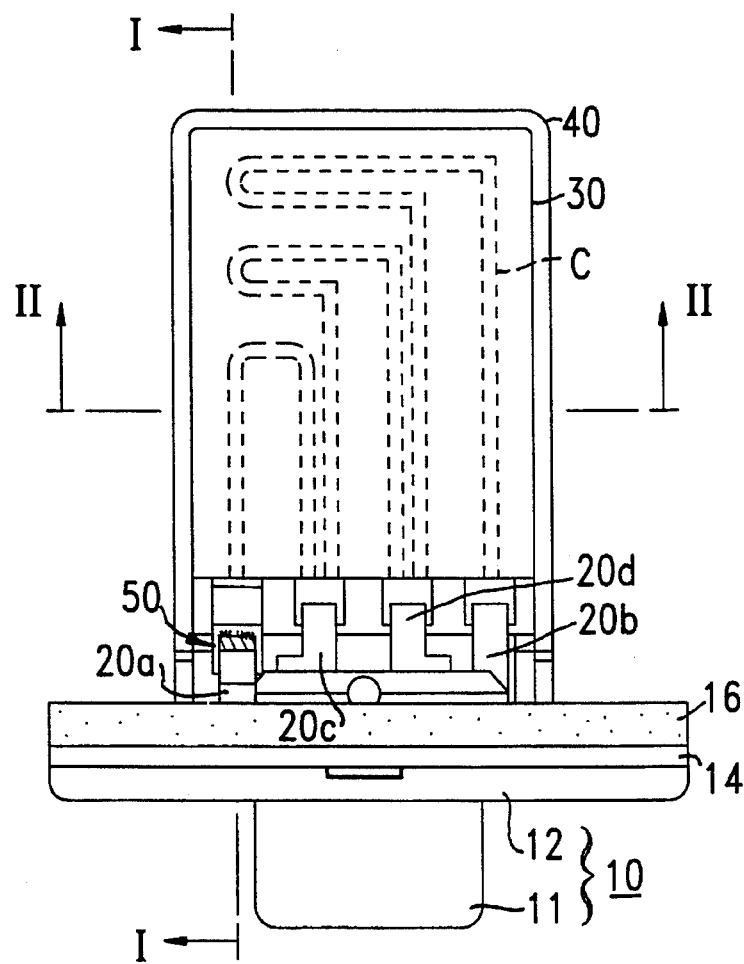
FIG. 1 is a front elevational view of a resistor device for controlling a rotational speed of a motor in accordance with the present invention.
Figure 2:
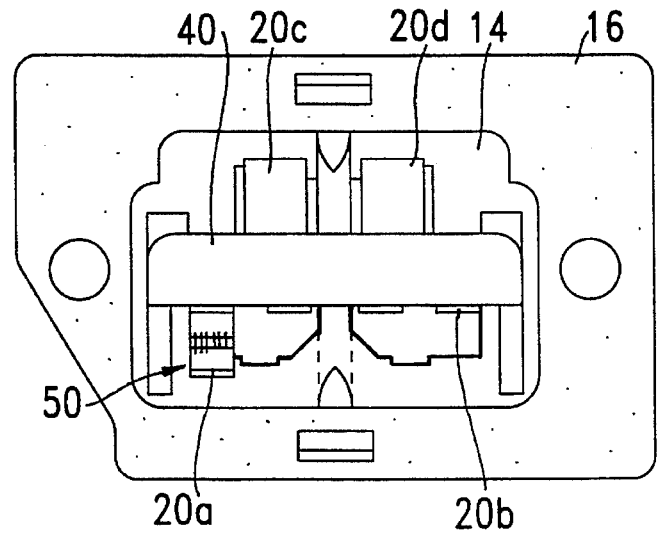
FIG. 2 is a top view of the device shown in FIG. 1.
Figure 3:
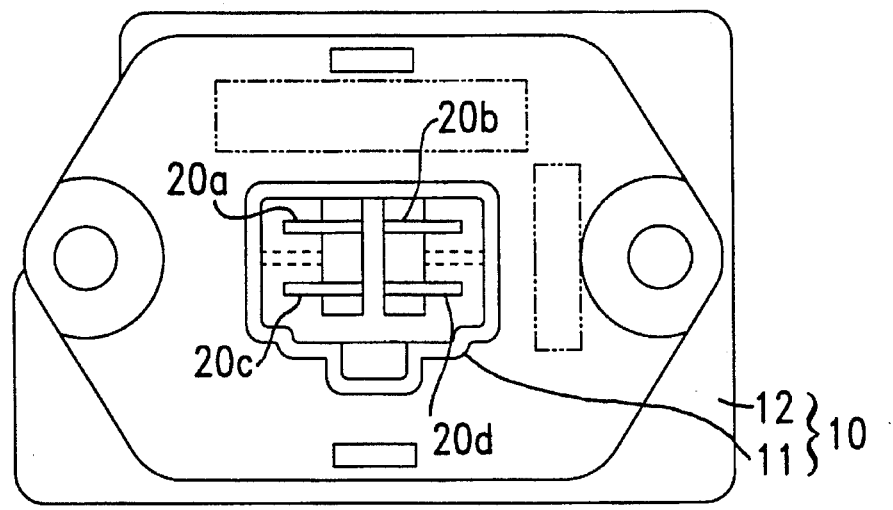
FIG. 3 is a bottom view of the device shown in FIG. 1.

FIG. 1 is a front view showing a resistor device in accordance with the present invention, FIG. 2 is a plane view, and FIG. 3 is a bottom view, respectively. As shown in the drawings, the resistor device of the present invention includes a tube-shaped socket 11 made to be narrower at its bottom. The device also includes a housing 10 formed by attaching the top of socket 11 to a wider fixed plate 12. A base plate 14, corresponding to the width of fixed plate 12, is integrally attached to the fixed plate 12 of the housing 10, and an elastic member 16 having a cushioning characteristic such as a sponge is attached to the base plate 14. The elastic member 16 absorbs a shock applied to the resistor device.

First to fourth connecting terminals 20a–20d are connected to the housing. One end of each of first to fourth connecting terminals 20a–20d passes through the fixed plate 12 and base plate 14 and upwardly extends therefrom to all directions of housing 10, and the other end of connecting terminals 20a–20d extend downwardly from the fixed plate 12 into the socket 11.

The first to fourth connecting terminals 20a–20d are used for connecting a resistance unit hereinafter described to a motor side (not shown). The first to fourth connecting terminals thereby permit the motor to be controlled at four steps.

Each end of first to fourth connecting terminals 20a–20d protruding from a top surface of base plate 14 of the housing 10 is connected to a resistor circuit C formed on a resistance unit 30. The resistance unit 30 being attached to a side surface of a heat sink 40. The heat sink 40 is formed by an aluminum having good thermal conductivity in order to easily radiate the heat generated by the resistor circuit C of the resistance unit 30. The heat sink 40 is firmly fixed at a predetermined position to the housing 10 so as to not be readily deformed, even by a shock from the exterior.

A open circuit means 50 for cutting of the power supplied to the motor side through the resistor circuit C is positioned between the resistor circuit C and connecting terminal 20a. A detailed structure for this is illustrated in FIG. 5.

Figure 4:
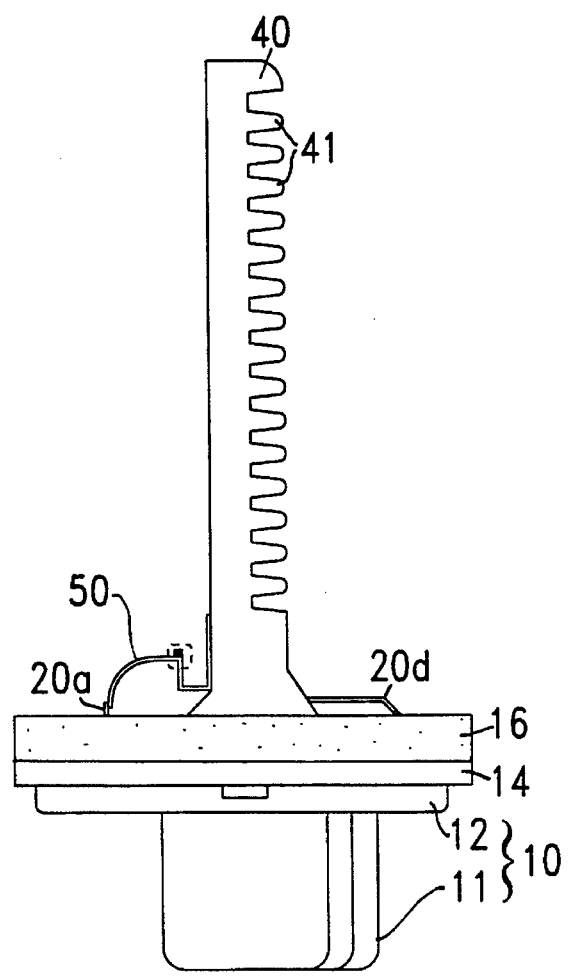
FIG. 4 is a right side view of the device shown in FIG.1.

Referring to FIG. 4, thermal radiating fins 41 are integrally attached to a side surface of the heat sink 40, thereby rapidly radiating heat from the heat sink 40. While the thermal radiating fins 41 illustrated in FIG. 4 are applied to only one side surface of the heat sink 40, it is recognized that thermal radiating fins may also be applied to other portions of the heat sink 40 as well.

Figure 5:
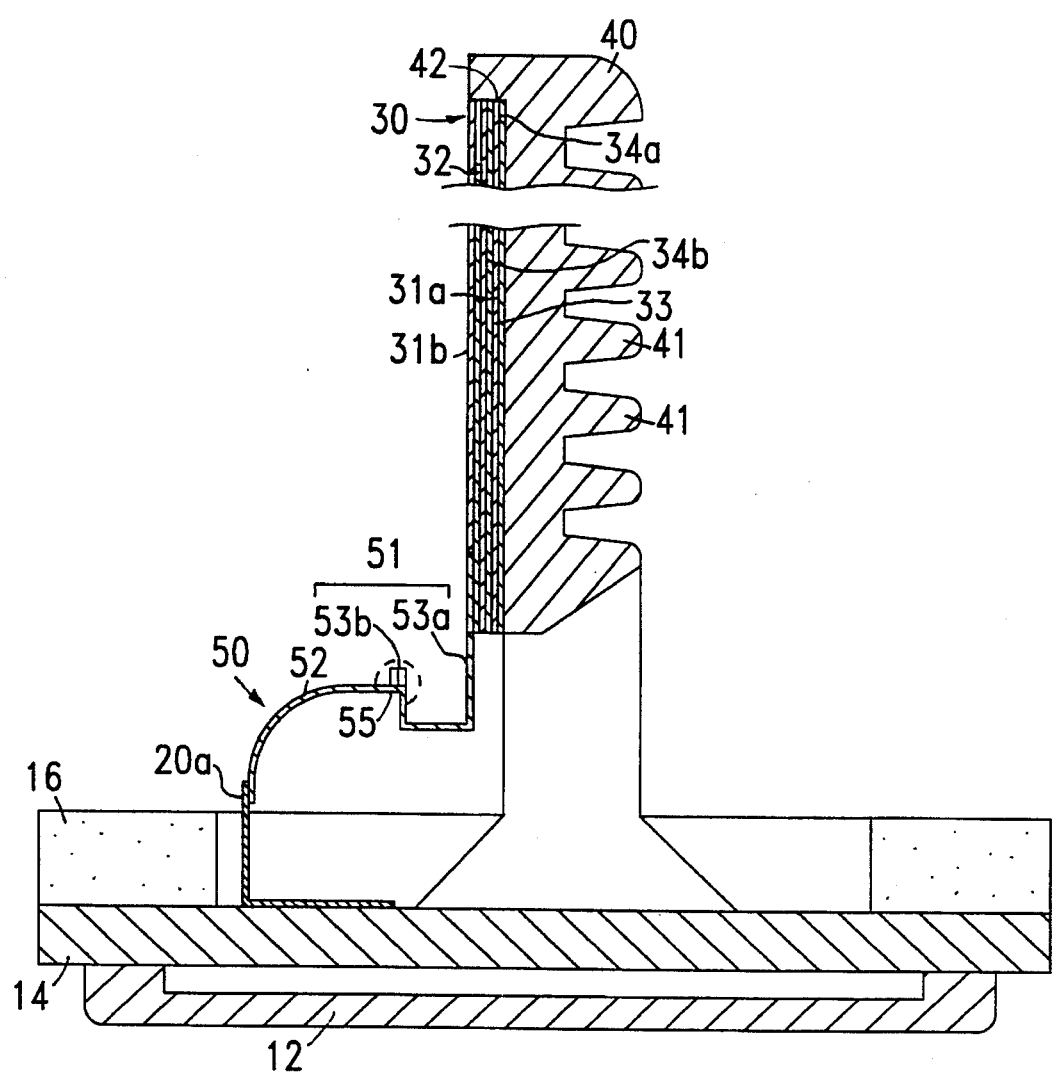
FIG. 5 is an enlarged longitudinal sectional view taken along line I—I of FIG. 1.
Figure 6:
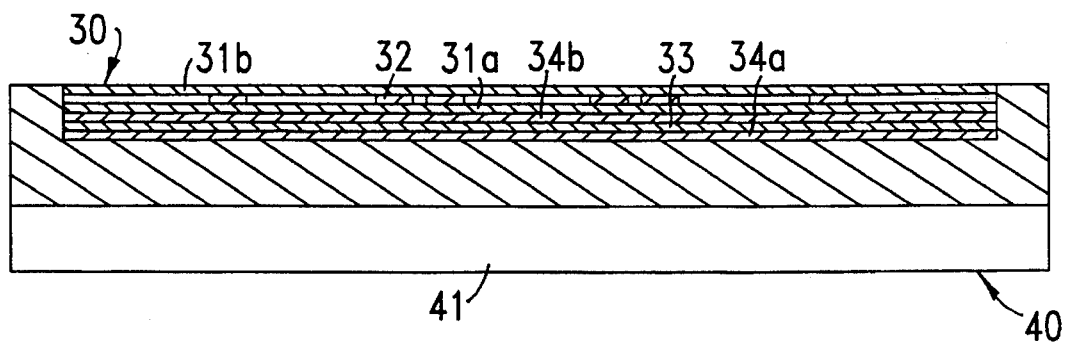
FIG. 6 is an enlarged lateral cross sectional view taken along line II—II of FIG. 1.

Referring to FIGS. 5–6, a recessed portion 42 is defined in a side surface of the heat sink 40, i.e., on the side surface opposite that surface where thermal radiating fins 41 are formed. The resistance unit 30 is received within recessed portion 42. The resistance unit 30 is made by integrally adhering a resistor piece 32 between a foil shaped first film 31a and second film 31b. The first and second films 31a, 31b are made from an insulating material. The resistor piece 32 is made from metal in order not to be readily damaged, and a resistor circuit C shown in FIG. 1 is formed from resistor piece 32.

The resistor unit 30 is firmly adhered via an insulator 33 to recessed portion 42. The insulator 33 is firmly attached to an interior surface of the recessed portion 42 of the heat sink 40 by a first adhering layer 34a made of an adhesive material. The resistance unit 30 is firmly attached to the insulator 33 by a second adhering layer made of an adhesive material.

The open-circuit means 50 is formed between the first connecting terminal 20a and the resistor piece 32 forming resistor circuit C as shown in FIG. 1. The open-circuit means 50 has a generally U-shaped configuration and includes a connecting piece 51 having at least two connecting points 53a, 53b and a fuse spring 52. The fuse spring has an elastic force and connects connecting piece 51 to first connecting terminal 20a.

The first connecting point 53a of the connecting piece 51 is connected to the resistor piece 32 and the second connecting point 53b is connected by solder to the fuse spring 52. A soldered portion 55, formed to the second connecting point 53b of the connecting piece 51 and the fuse spring 52, is set so as to be fused at a predetermined high temperature occurring when a mechanical defect in the motor causes an overload. Therefore, the power supply applied to the motor side through the resister unit 30 is immediately cut off, thereby preventing damage to the motor caused by the high temperature heat.

Figure 7:
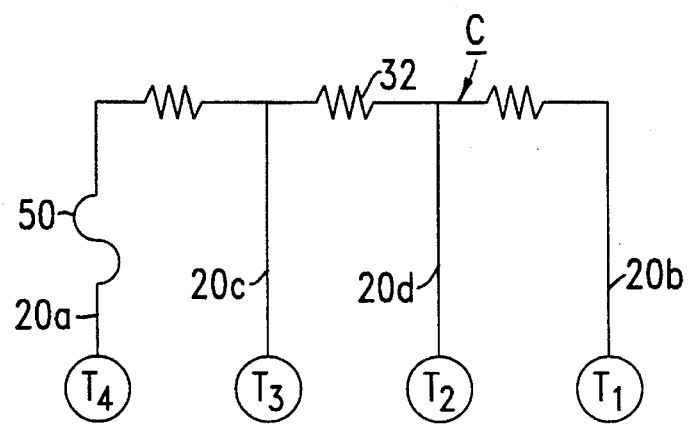
FIG. 7 is a circuit diagram applied to a resistor device for controlling a rotational speed of a motor in accordance with the present invention.

FIG. 7 is a diagram of the resistor circuit applied to the resistor in accordance with the present invention. The resistor circuit C is made by generally disposing the resistor piece 32 into three portions. First to fourth connecting terminals 20a–20d are connected to respective resistor piece 32. Therefore, the rotational speed of the motor can be controlled by voluntarily selecting from a low (first step) stage to a high (fourth step) stage. That is, when any one of the operating switches (not shown) provided between the resistor and the motor is selected, a desired rotational speed of the motor can be obtained. The rotational speed of the motor varies with the selection of each step because the resistance value of the resistor piece 32 is set by lower value as it goes from the lower stage to the higher stage. Since the higher step side is easily overloaded, the open-circuit means 51 is connected to the higher step side. The number of resistor pieces 32 may vary from the drawing shown, and accordingly, the steps shown for controlling the speed of the motor would vary as well from the drawing.

Thus, the present invention provides an increased strength which is not easily broken or cracked by an external force by forming the resistor circuit C of the resistor unit 30 from a foil shaped metal piece and a film.

In addition, since the open-circuit means for preventing damage to the motor is independently formed by the connecting member at a predetermined position apart from the resistance unit, there is an increased thermal radiating effect capable of immediately radiating the heat generated by the resistor circuit C away from the open-circuit means 50. Furthermore, the present invention prevents a fuse material, such as a residual of the soldered portion 55 produced upon making a open-circuit, from being smeared to the resistance unit 30.

I claim:

1. A resistor device for controlling a rotational speed of a motor comprising:

(a) a housing;

(b) a fixed plate attached to said housing;

(c) connecting terminals extending upwardly from said fixed plate;

(d) a heat sink attached to said fixed plate for radiating heat produced by said resistor device, said heat sink having a receiving recessed portion on a side surface thereof;

(e) a resistance unit comprising a metal band-shaped member closely contacted between a first film and a second film in a foil shape, said resistance unit received within said receiving recessed portion of said heat sink and connected to said connecting terminals to form a resistance circuit; and (f) an open-circuit means having a soldered portion characterized by fusing at a predetermined temperature, said open-circuit means positioned a predetermined distance from said resistance unit and connected to said resistance unit and a connecting terminal.

2. A resistor device for controlling the rotational speed of a motor as defined in claim 1, further comprising an insulator positioned between the film of said resistance unit and said receiving recessed portion.

3. A resistor device for controlling the rotational speed of a motor as defined in claim 1, wherein said open-circuit means includes a connecting piece connected to said resistance unit by at least two connecting points and a fuse spring having an elastic force connected to one of the connecting points and a connecting terminal.

4. A resistor device for controlling the rotational speed of a motor as defined in claim 3, wherein said soldered portion of said open-circuit means is formed at a connecting point of said fuse spring and said connecting piece.

5. A resistor device for controlling the rotational speed of a motor as defined in claim 3, wherein said connecting piece is generally U-shaped.

6. A resistor device for controlling the rotational speed of a motor as defined in claim 1, wherein said first and second films are made of an insulating material.

\* \* \* \* \*